(12) United States Patent
Harper et al.

(10) Patent No.: US 9,449,637 B2
(45) Date of Patent: Sep. 20, 2016

(54) REDUCED REEL MOTOR DISTURBANCES IN A TAPE DRIVE SYSTEM

(71) Applicant: International Business Machines Corporation, Armonk, NY (US)

(72) Inventors: David H. F. Harper, Vail, AZ (US); Hugo E. Rothuizen, Oberrieden (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 14/251,455

(22) Filed: Apr. 11, 2014

(65) Prior Publication Data

US 2015/0294683 A1    Oct. 15, 2015

(51) Int. Cl.
| | |
|---|---|
| *G11B 15/18* | (2006.01) |
| *H02K 3/20* | (2006.01) |
| *H02K 1/30* | (2006.01) |
| *H02K 1/27* | (2006.01) |

(52) U.S. Cl.
CPC ............... *G11B 15/18* (2013.01); *H02K 1/30* (2013.01); *H02K 3/20* (2013.01); *H02K 1/2733* (2013.01)

(58) Field of Classification Search
None
See application file for complete search history.

(56) References Cited

U.S. PATENT DOCUMENTS

| | | | |
|---|---|---|---|
| 4,049,985 A | 9/1977 | Sudler | |
| 4,647,803 A | 3/1987 | von der Heide et al. | |
| 5,598,048 A | 1/1997 | Dunfield et al. | |
| 5,864,443 A | 1/1999 | Elsaesser et al. | |
| 6,031,310 A * | 2/2000 | Ishikawa et al. | 310/156.21 |
| 6,160,331 A * | 12/2000 | Morreale | 310/51 |
| 6,191,510 B1 * | 2/2001 | Landin et al. | 310/51 |
| 6,408,502 B1 * | 6/2002 | Brahmavar et al. | 29/596 |
| 6,445,096 B1 * | 9/2002 | Saito et al. | 310/67 R |
| 6,448,679 B1 * | 9/2002 | Imlach | 310/90.5 |
| 7,045,923 B2 * | 5/2006 | Fujii | 310/156.43 |
| 7,120,986 B2 * | 10/2006 | Kojima et al. | 29/596 |
| 7,876,521 B2 * | 1/2011 | Cherubini et al. | 360/71 |
| 8,299,661 B2 * | 10/2012 | Jeung | 310/51 |
| 8,456,043 B2 | 6/2013 | Jeung | |
| 2014/0111039 A1 * | 4/2014 | Hashish et al. | 310/51 |

OTHER PUBLICATIONS

"Brushless DC electric motor," http://en.wikipedia.org/wiki/Brushless_DC_electric_motor, last modified Apr. 2, 2014, pp. 1-4.

\* cited by examiner

*Primary Examiner* — Wayne Young
*Assistant Examiner* — James L Habermehl
(74) *Attorney, Agent, or Firm* — Zilka-Kotab, PC

(57) ABSTRACT

An apparatus according to one embodiment includes a motor having: a rotor, a magnet, and a damping layer positioned between the rotor and the magnet. The damping layer is constructed of a material characterized by converting kinetic energy into heat.

17 Claims, 8 Drawing Sheets

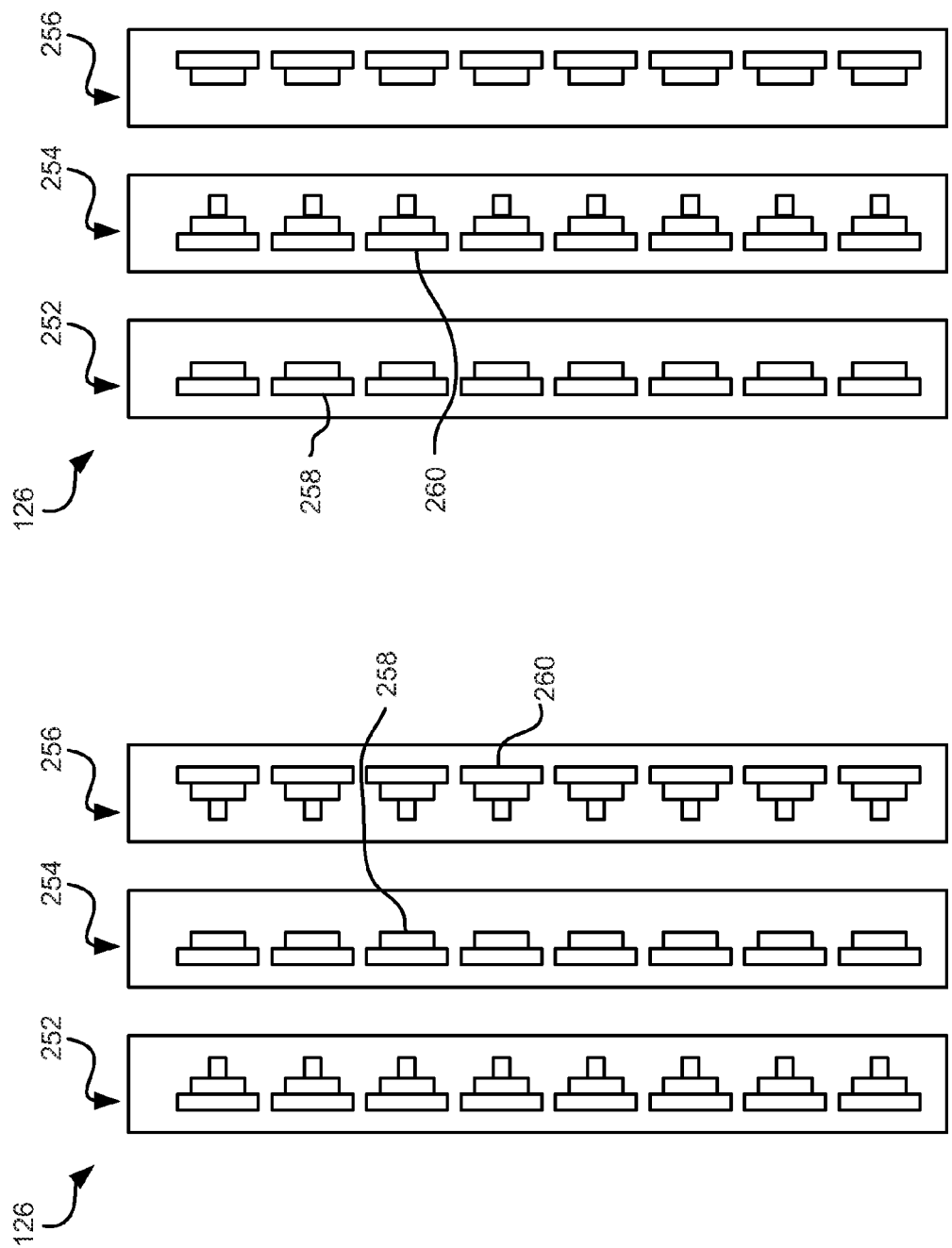

REDUCED REEL MOTOR DISTURBANCES IN A TAPE DRIVE SYSTEM

BACKGROUND

The present invention relates to data storage systems, and more particularly, this invention relates to tape drive motors having reduced runtime disturbances.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so a goal in these systems is to have the read elements in near contact with the tape to provide effective coupling of the magnetic field from the tape to the read elements.

BRIEF SUMMARY

An apparatus according to one embodiment includes a motor having: a rotor, a magnet, and a damping layer positioned between the rotor and the magnet. The damping layer is constructed of a material characterized by converting kinetic energy into heat.

A tape drive system includes a magnetic head, and a drive mechanism for passing a magnetic medium over the magnetic head. The drive mechanism includes a motor having: a rotor, a magnet, and a damping layer positioned between the rotor and the magnet. The damping layer is constructed of a material characterized by converting kinetic energy into heat.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 6 is a partial tape bearing surface view of a magnetic head having a write-read-write configuration.

FIG. 7 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Furthermore, it should be noted that, as used herein, the term "about" with reference to some stated value refers to the stated value±10% of said value.

The following description discloses several preferred embodiments of magnetic storage systems, as well as operation and/or component parts thereof. Various embodiments reduce the disturbances from tape drive reel motors by applying a constrained layer having a damping material between the motor magnet subassembly and the reel motor rotor flange supporting the magnet sub assembly.

In one general embodiment, an apparatus includes a motor having: a rotor, a magnet, and a damping layer positioned between the rotor and the magnet. The damping layer is constructed of a material characterized by converting kinetic energy into heat.

In another general embodiment, a tape drive system includes a magnetic head, and a drive mechanism for passing a magnetic medium over the magnetic head. The drive mechanism includes a motor having: a rotor, a magnet, and a damping layer positioned between the rotor and the magnet. The damping layer is constructed of a material characterized by converting kinetic energy into heat.

Figure 1A:
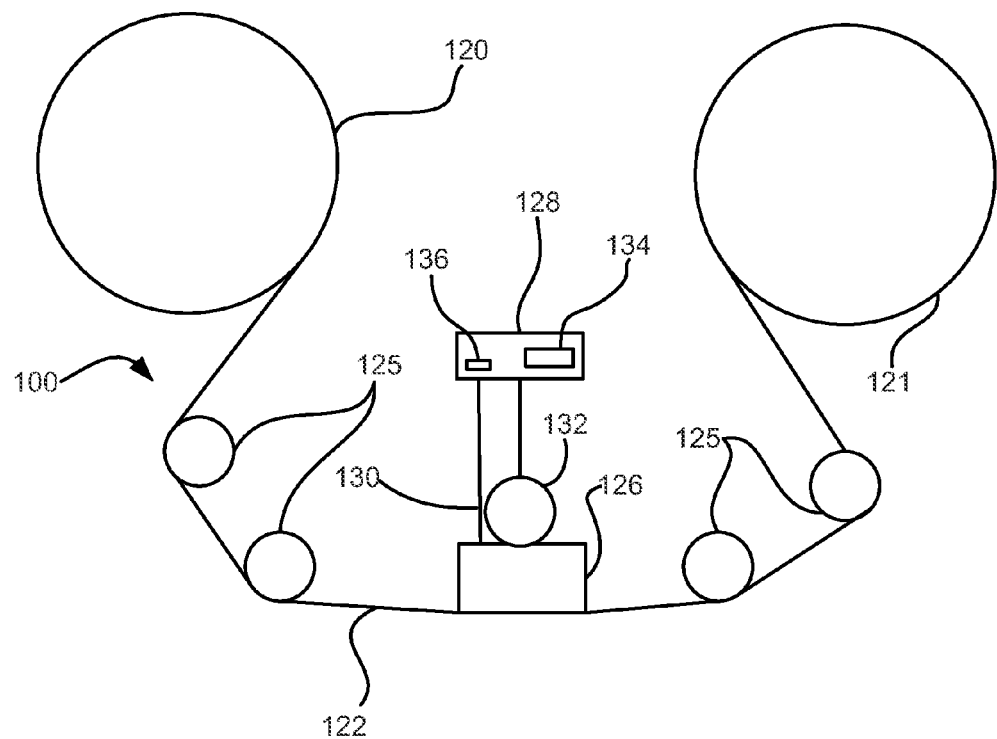
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

According to various embodiments, the drive motor(s) may include any of the illustrative motor configurations described in detail below, e.g., see FIGS. 8-11B. In preferred embodiments, "motors" as used herein refer to brushless motors, but are in no way limited thereto. Moreover, according to various embodiments, any of the motors described herein may include direct current (DC) or alternating current (AC) motors as will be appreciated by one skilled in the art upon reading the present description.

Referring still to FIG. 1A, guides 125 guide the tape 122 across the tape head 126. Such tape head 126 is in turn coupled to a controller 128 via a cable 130. The controller 128, may be or include a processor and/or any logic for controlling any subsystem of the tape drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
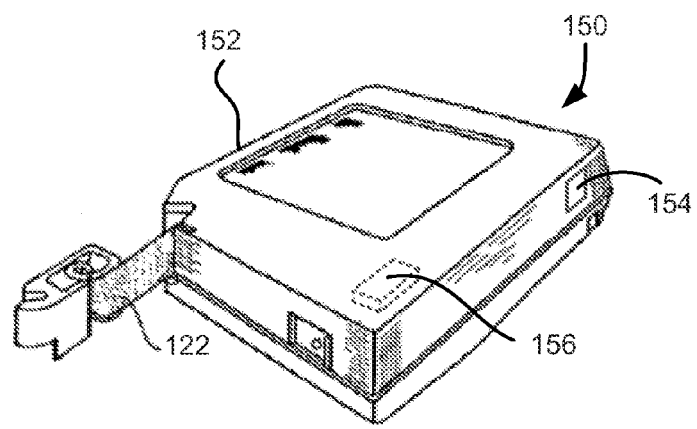
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
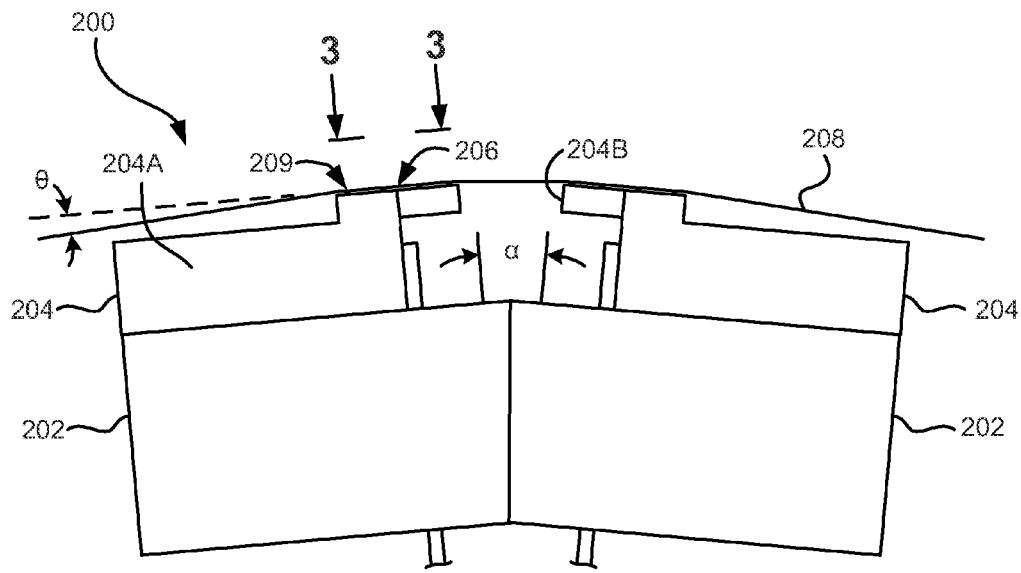
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media bearing surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 3:
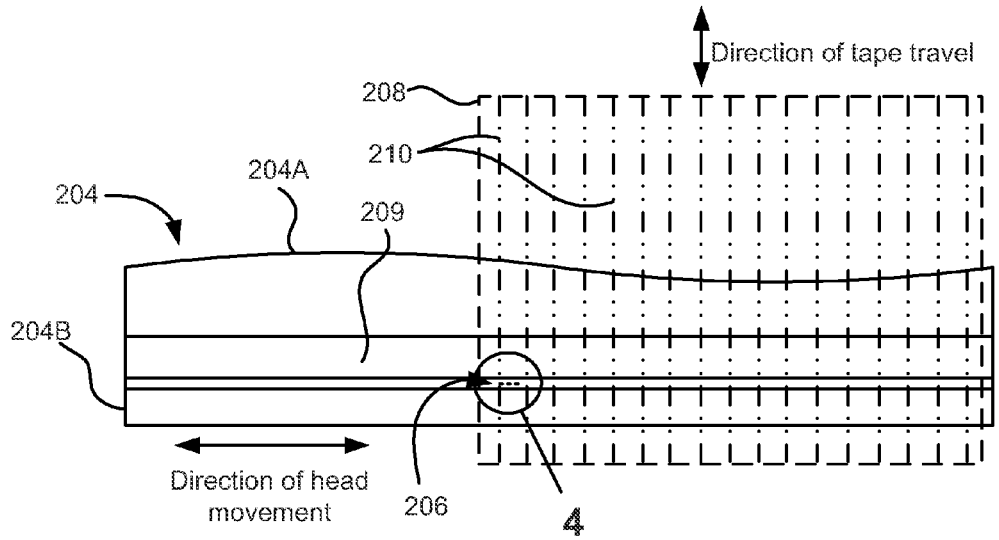
FIG. 3 is a tape bearing surface view taken from Line 3-3 of FIG. 2.

FIG. 3 illustrates the tape bearing surface 209 of one of the modules 204 taken from Line 3-3 of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 3 on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 4:
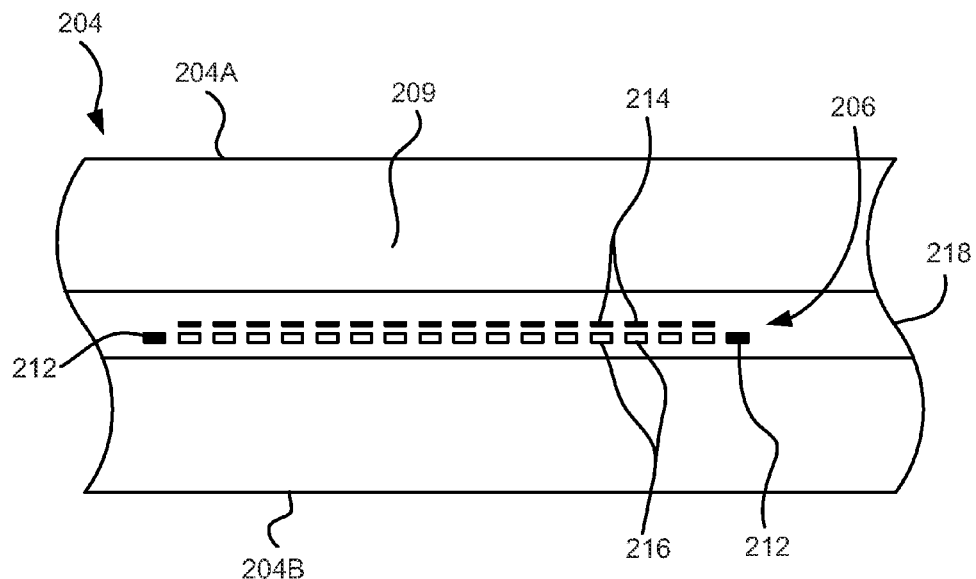
FIG. 4 is a detailed view taken from Circle 4 of FIG. 3.

FIG. 4 depicts a plurality of readers and/or writers 206 formed in a gap 218 on the module 204 in Circle 4 of FIG. 3. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 4, the readers 216 and writers 214 may also be arranged in an interleaved configuration. Alternatively, each array of readers and/or writers 206 may be readers or writers only, and the arrays may contain one or more servo readers 212. As noted by considering FIGS. 2-4 together, each module 204 may include a complementary set of readers and/or writers 206 for such things as bi-directional reading and writing, read-while-write capability, backward compatibility, etc.

Figure 5:
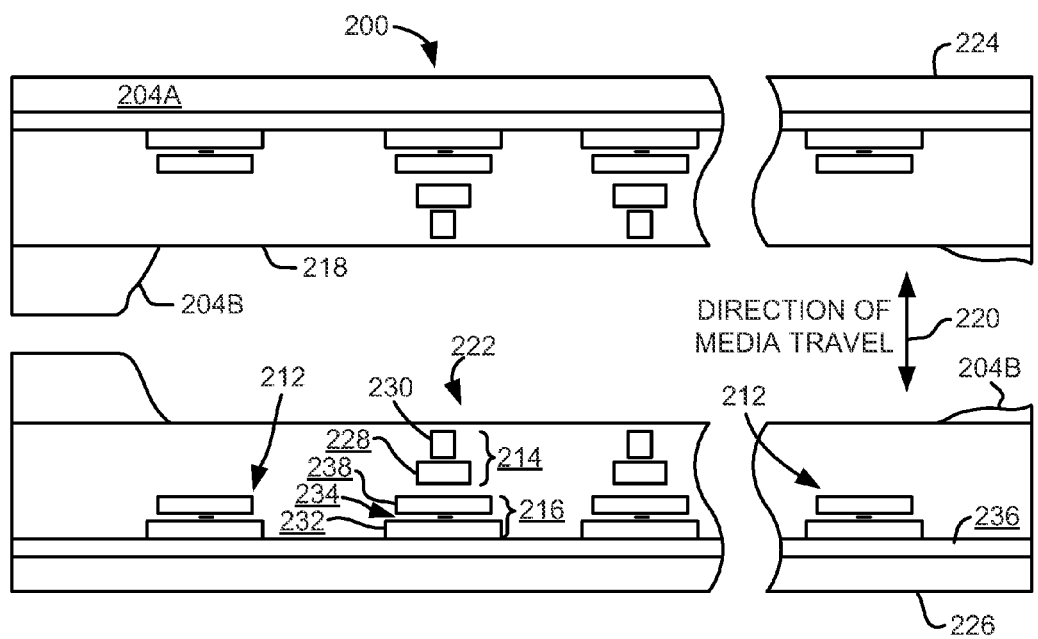
FIG. 5 is a detailed view of a partial tape bearing surface of a pair of modules.

FIG. 5 shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alum ma a and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 6 includes one or more arrays of readers 258 in a similar configuration. Variations of a multi-module head include a R-W-R head (FIG. 7), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Brushless motors for various tape drives are controlled by pulsing the input voltage. Coils are energized by the input voltage in pulsing configurations thereby creating magnetic fields which influence rotational motion of the motor. This provides the ability to control the rotational speed of the motor but also has the side effect of inputting near square wave pulses into the motor. As a result, high frequency content, contained within the near square waveform, is injected into the hardware that make up the motor components. Moreover, it has been observed that when the pulse rate of the input voltage is at a particular frequency, the rotor of the motor can be driven to resonate at one of the mode shapes natural to the particular rotor. The result is that the head to tape interface is disturbed by one or more modes of the motor. Furthermore, as the motor resonates, increased position error signal (PES) is observed in the tape drive operation. Particularly, in a tape drive, resonance along the rotational axis of the motor, perpendicular to the direction of tape travel, causes the reel carrying the tape to shift up and down, which in turn causes the tape to similarly shift as it passes over the head. Such shifting increases PES.

Reshaping the pulsing input voltage to the motor is not a viable option. In sharp contrast, various embodiments described herein desirably reduce or eliminates PES of tape drives by implementing a damping layer. As a result, the embodiments described herein desirably achieve improved track following operations, as will be described in further detail below.

Figure 8:
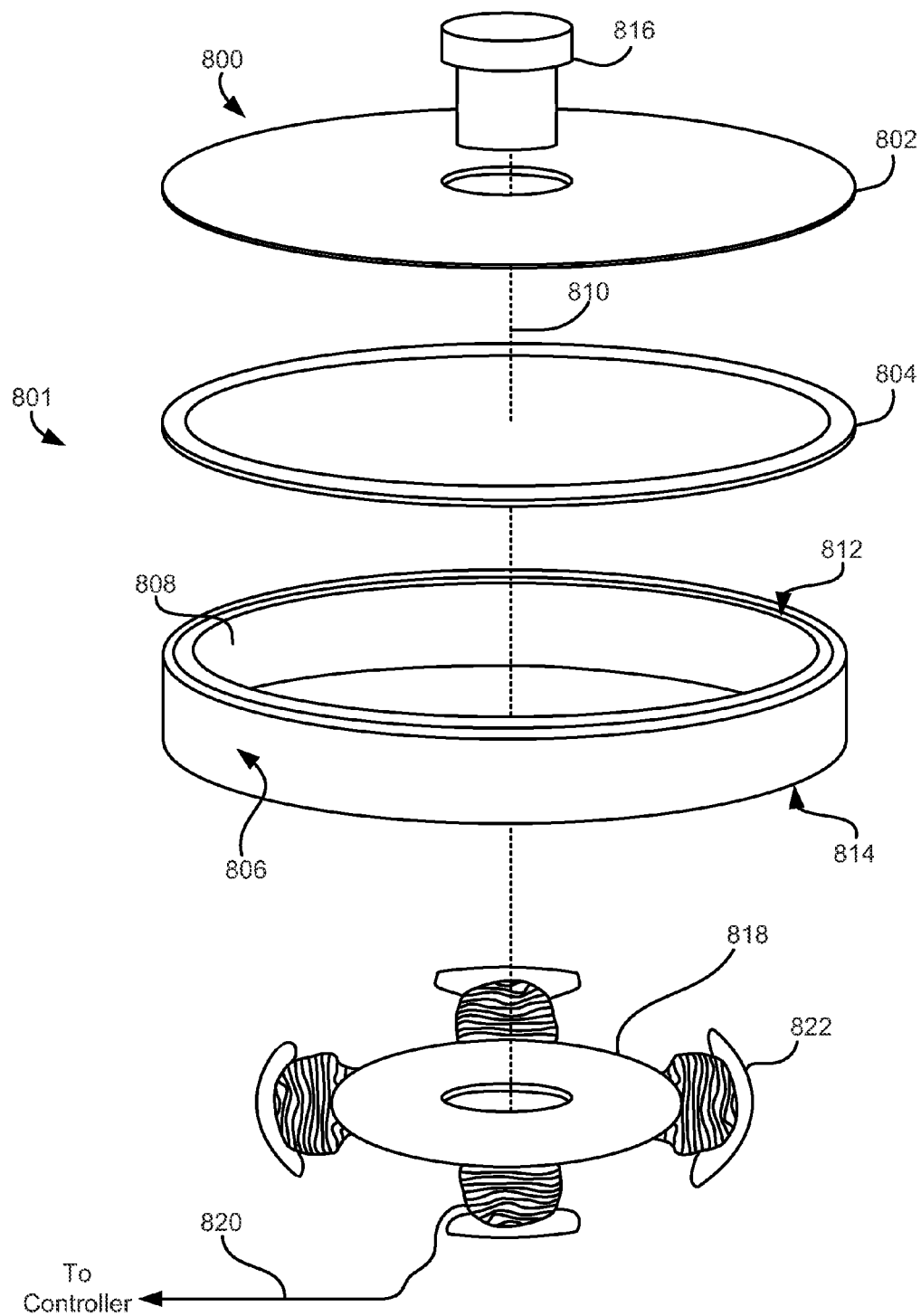
FIG. 8 is a partial exploded view of an apparatus according to one embodiment.

FIG. 8 depicts an apparatus 800, in accordance with one embodiment. As an option, the present apparatus 800 may be implemented in conjunction with features from any other embodiment listed herein, such as those described with reference to the other FIGS. Of course, however, such apparatus 800 and others presented herein may be used in various applications and/or in permutations which may or may not be specifically described in the illustrative embodiments listed herein.

Further, the apparatus 800 presented herein may be used in any desired environment. Thus FIG. 8 (and the other FIGS.) should be deemed to include any and all possible permutations. Note that additional components may be present in some embodiments. Moreover, unless otherwise specified, the various components of the apparatus 800 in this and other embodiments may be formed using conventional processes.

Referring now to FIG. 8, the apparatus 800 includes a motor 801 having a rotor 802. The rotor 802 of apparatus 800 is illustrated as having a flange configuration, e.g., a disk-like shape. However, according to other embodiments, the rotor 802 may have a different shape and/or construction depending on the preferred embodiment, as will be described in further detail below, e.g., see 1010 of FIGS. 10A-11B.

The apparatus 800 of FIG. 8 further includes a magnet 808, a damping layer 804, and a pole piece 806. The magnet 808, damping layer 804 and pole piece 806 are preferably fixed relative to each other. In other words, the magnet 808, damping layer 804 and pole piece 806 are coupled to each other such that they are not independently movable or rotatable. In some approaches, the magnet 808, damping layer 804 and/or pole piece 806 may be coupled together using adhesives, e.g., double sided adhesives, heat triggered adhesives, pressure triggered adhesives, etc.; a pressure fit; thermal bond; etc.

Furthermore, according to the present embodiment, the magnet 808, the pole piece 806, and the damping layer 804 are concentric rings. The magnet 808 has an annular circumferential sidewall extending between first and second ends 812, 814 respectively. Moreover, the damping layer 804 is positioned between the first end 812 of the magnet 808 and the rotor 802. By positioning the damping layer 804 between the rotor 802 and the magnet 808, the damping layer 804 may desirably reduce PES experienced by the apparatus, as will soon become apparent.

Apparatus 800 further includes an axle 816 of known construction, which rotationally couples the rotor 802 to the other components of the motor. The axle 816 may be coupled to a chuck (not shown) that drives a tape spool, for example. Additionally, apparatus 800 includes coiled poles 822 of a stator 818, of known construction. Lead line thread 820 is coupled to a controller (not shown), in order to energize the coiled poles 822.

As noted above, brushless motors typically exhibit torque pulsations along the rotational axis 810. Torque pulsations in a tape drive lead to vertical shift of a tape reel, which in turn translates into a shift in tape position relative to the head, manifesting itself in increased PES.

In preferred embodiments, the damping layer 804 includes a material characterized by converting kinetic energy into heat (e.g., microscopic amounts of heat). Thus according to various approaches, the damping layer 804 may include neoprene, foam, 3M High Performance acrylic pressure sensitive adhesive available from 3M having a sales address at 3M Center, St. Paul, Minn. 55144; 3M VHB closed cell acrylic pressure sensitive adhesive, 3M Vibration Damping Tapes 434, 435, 436, Roush damping foams available from Roush having a sales address at 12011 Market St., Livonia, Mich. 48150; energy dissipative rubber materials, damping adhesives, etc., or any other energy dissipative material which would be apparent to one skilled in the art upon reading the present description.

The damping layer 804, by having a material characterized by converting kinetic energy into heat, is able to reduce the high frequency content resulting from the pulsing input voltage of the motor 801, thereby dissipating any undesirable non-rotational movements of the magnet 808, e.g., primarily along a rotational axis 810 thereof. As previously mentioned, the damping layer 804 desirably reduces the disturbances caused by the pulsing input voltage. Specifically, in preferred embodiments the damping layer 804 serves advantageously to dampen the pulsed forces transmitted to the magnet 808 in the axial direction, i.e., along rotational axis 810, and allow the low frequency content of the driving pulses to be transferred to the rotor 802. Thus the rotor 802 is allowed to rotate about an axis 810 as desired while reducing the high frequency content in the input pulse, as is apparent in the modeling of FIG. 9.

Figure 9:
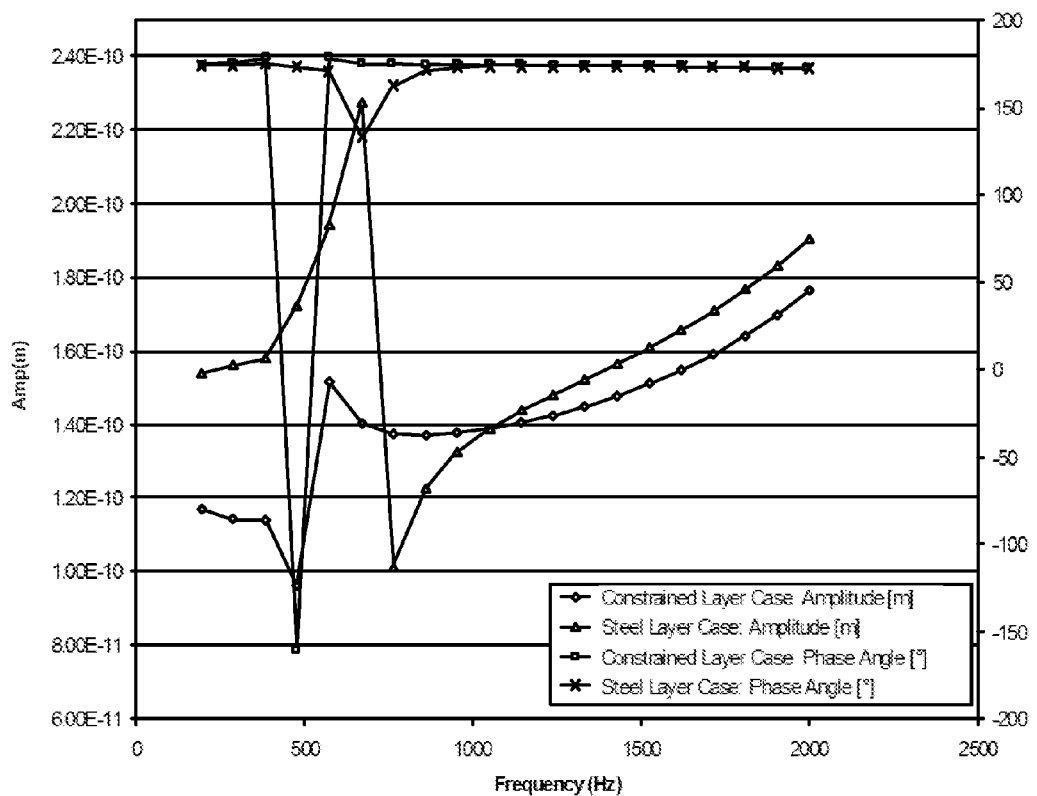
FIG. 9 is a modeled comparison of transfer functions for damping layers according to several embodiments.

FIG. 9 depicts a graphical comparison 900 achieved using modeling for transfer functions according to different embodiments. Particularly, the graphical comparison 900 illustrates data corresponding to the amplitude of resonances arising with damping layers constructed of two different materials. Modeling was conducted on an apparatus substantially similar to that of apparatus 800 in FIG. 8. The plot labeled "Constrained Layer Case" represents data pertaining to an embodiment having a Neoprene rubber damping layer, while the plot labeled "Steel Layer Case" represents data pertaining to an embodiment having a steel damping layer. Furthermore, the modeling was limited to 2 kHz for the purpose of demonstrating the effect on a mode that has experimentally been observed to contribute to additional PES during the operation of an exemplary tape drive.

During modeling, simulated energy was input into the magnet, whereby the amplitude and phase angle of the motion that occurred during the resonance was plotted. Looking to FIG. 9, it can be seen that the Constrained Layer Case desirably has a resonance peak at about 500 Hz compared to the resonance peak at about 600 Hz for the Steel Layer Case. Moreover, the Constrained Layer Case resonance peak is lower amplitude than that of the Steel Layer Case. It follows that, by implementing a damping layer having at least one of the materials described above (e.g., see description of 804), the amplitude of the magnet's motion would be significantly reduced when transferred to the rotor of a motor. Therefore, PES of the apparatus is reduced and an improved track following operation is desirably achieved.

As described above, although the rotor 802 of apparatus 800 is illustrated as having a flange configuration, e.g., a disk-like shape, according to other embodiments, a rotor may have a different shape and/or construction depending on the preferred embodiment. Looking to FIGS. 10A-11B, the apparatuses 1000, 1100 include rotors having a cup configuration, as will soon become apparent.

Figure 10A:
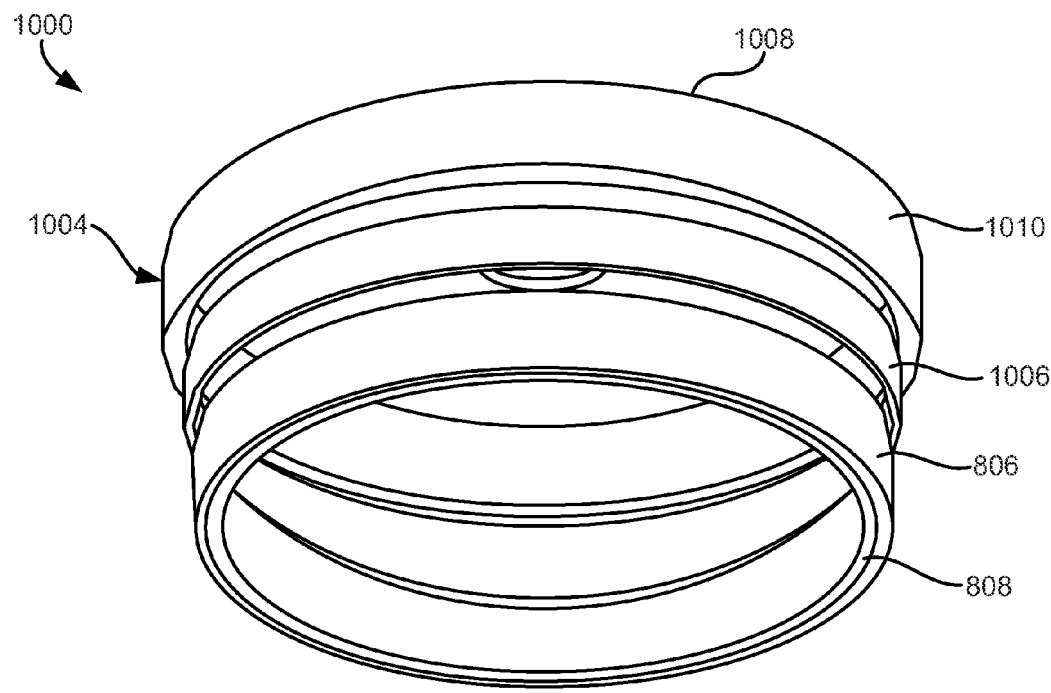
FIG. 10A is a partial exploded perspective view of an apparatus according to one embodiment.
Figure 10B:
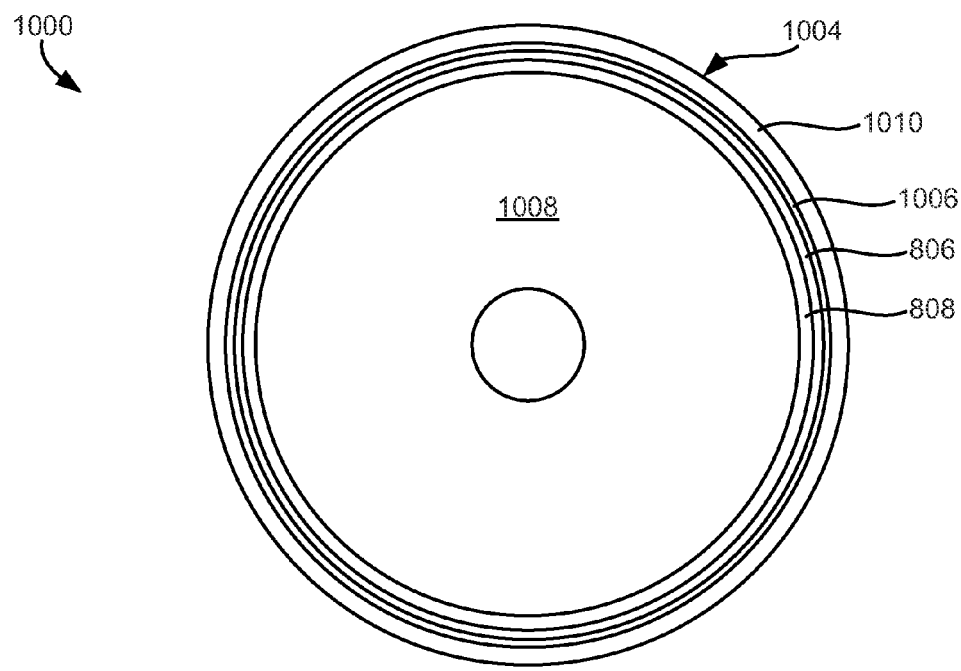
FIG. 10B is a partial bottom view of the motor in FIG. 10A.

FIGS. 10A-10B depict apparatus 1000, in accordance with one embodiment. As an option, the present apparatus 1000 may be implemented in conjunction with features from any other embodiment listed herein, such as those described with reference to the other FIGS., such as FIG. 8. Accordingly, various components of FIGS. 10A-10B have common numbering with those of FIG. 8.

Of course, however, such apparatus 1000 and others presented herein may be used in various applications and/or in permutations which may or may not be specifically described in the illustrative embodiments listed herein. Further, the apparatus 1000 presented herein may be used in any desired environment. Thus FIGS. 10A-10B (and the other FIGS.) should be deemed to include any and all possible permutations.

Referring now to FIGS. 10A-10B, rotor 1010 has a cup configuration as opposed to the flange configuration of the rotor 802 in FIG. 8. Thus, the rotor 1010 of apparatus 1000 is cup shaped, having a sidewall 1004 extending away from a flange 1008 of the rotor 1010, and along an outer circumference of the magnet 808.

With continued reference to FIGS. 10A-10B, the damping layer 1006 is illustrated as being positioned between the pole piece 806 and the sidewall 1004 of the rotor 1010. The pole piece 806 is oriented between the magnet 808 and the sidewall 1004 of the rotor 1010. Furthermore, the pole piece 806 is positioned between the magnet 808 and the damping layer 1006.

Figure 11A:
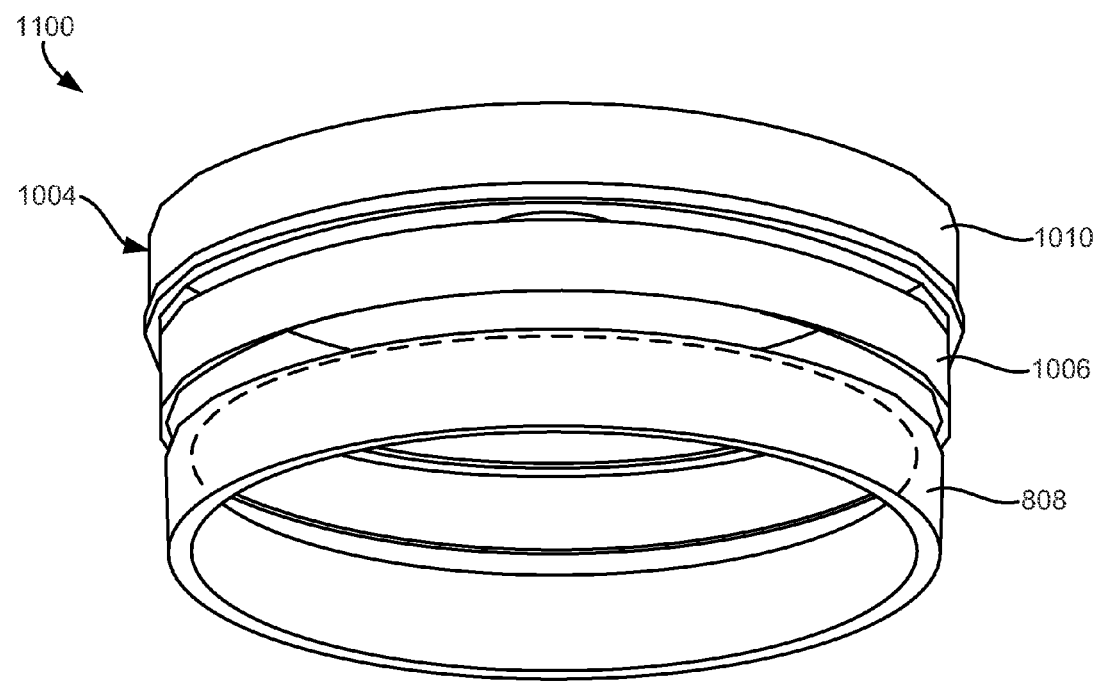
FIG. 11A is a partial exploded perspective view of an apparatus according to one embodiment.
Figure 11B:
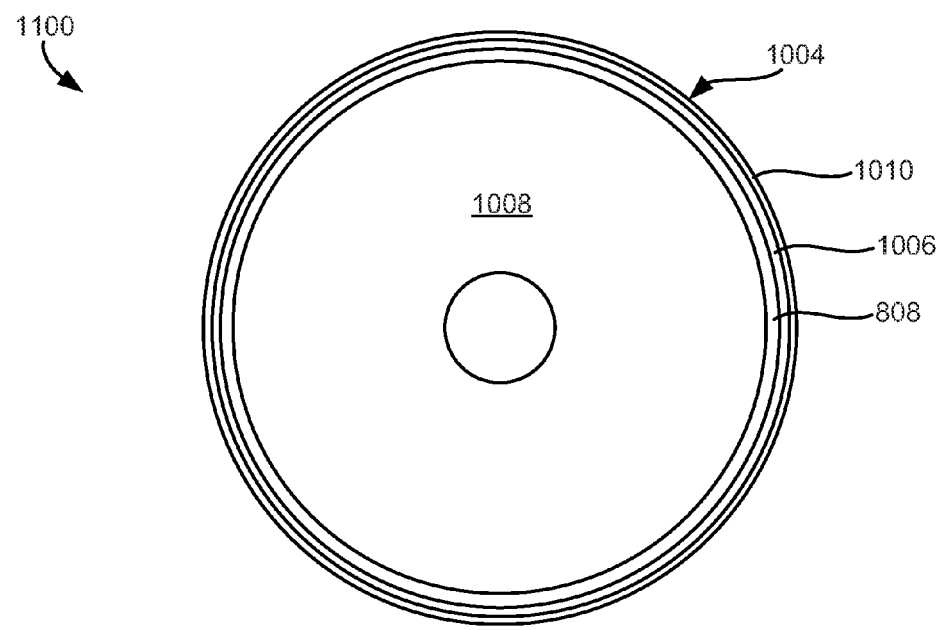
FIG. 11B is a partial bottom view of the motor in FIG. 11A.

FIGS. 11A-11B depict apparatus 1100, in accordance with one embodiment. As an option, the present apparatus 1100 may be implemented in conjunction with features from any other embodiment listed herein, such as those described with reference to the other FIGS., such as FIG. 8. Accordingly, various components of FIGS. 11A-11B have common numbering with those of FIG. 8.

Of course, however, such apparatus 1100 and others presented herein may be used in various applications and/or in permutations which may or may not be specifically described in the illustrative embodiments listed herein. Further, the apparatus 1100 presented herein may be used in any desired environment. Thus FIGS. 11A-11B (and the other FIGS.) should be deemed to include any and all possible permutations.

It will be clear that the various features of the foregoing systems and/or methodologies may be combined in any way, creating a plurality of combinations from the descriptions presented above. Furthermore, it should be noted that any of the "motors" described herein are not limited to being tape drive motors. Rather, any of the embodiments described above may be implemented in DC brushless motors, AC brushless motors, etc., and/or any other type of motor which would be apparent to one skilled in the art upon reading the present description.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a motor having:
a rotor;
a magnet;
a damping layer positioned between the rotor and the magnet; and
a pole piece positioned between the magnet and the damping layer,
wherein the damping layer is constructed of a material characterized by converting kinetic energy into heat.

2. The apparatus of claim 1, wherein the magnet, the pole piece, and the damping layer are concentric rings.

3. The apparatus of claim 1, wherein the damping layer is positioned between the pole piece and the rotor.

4. The apparatus of claim 1, wherein the rotor has a cup shape, having a sidewall extending away from a flange and along an outer circumference of the magnet.

5. The apparatus of claim 4, further comprising a pole piece between the magnet and the sidewall of the rotor, wherein the damping layer is positioned between the pole piece and the sidewall of the rotor.

6. The apparatus of claim 1, wherein the pole piece is detachably coupled to the rotor.

7. The apparatus of claim 1, wherein the damping layer is detachably coupled to the rotor.

8. The apparatus of claim 1, further comprising:
a magnetic head;
a guide for guiding a magnetic medium over a magnetic head; and
a controller electrically coupled to the magnetic head.

9. A tape drive system, comprising:
a magnetic head; and
a drive mechanism for passing a magnetic medium over the magnetic head, the drive mechanism including a motor having:
a rotor, wherein the rotor has a cup shape, having a sidewall extending away from a flange and along an outer circumference of the magnet;
a magnet; and
a separate damping layer positioned between the rotor and the magnet; and
a pole piece between the magnet and the sidewall of the rotor, wherein the damping layer is positioned between the pole piece and the sidewall of the rotor, wherein the damping layer is constructed of a material characterized by converting kinetic energy into heat.

10. The tape drive system of claim 9, further comprising: a controller electrically coupled to the magnetic head.

11. An apparatus, comprising:
a motor having:
a magnet;
a rotor wherein the rotor has a cup shape, having a sidewall extending away from a flange and along an outer circumference of the magnet;
a damping layer positioned between the rotor and the magnet, wherein the damping layer is constructed of a material characterized by converting kinetic energy into heat; and
a pole piece between the magnet and the sidewall of the rotor, wherein the damping layer is positioned between the pole piece and the sidewall of the rotor.

12. The apparatus of claim 11, wherein the pole piece is detachably coupled to the rotor.

13. The apparatus of claim 11, wherein the damping layer is positioned between the pole piece and the rotor.

14. The apparatus of claim 11, wherein the pole piece is positioned between the magnet and the damping layer.

15. A tape drive system, comprising:
a magnetic head; and
a drive mechanism for passing a magnetic medium over the magnetic head, the drive mechanism including a motor having:
a rotor;
a magnet;
a separate damping layer positioned between the rotor and the magnet; and
a pole piece positioned between the magnet and the damping layer,
wherein the damping layer is constructed of a material characterized by converting kinetic energy into heat.

16. The apparatus of claim 15, wherein the sidewall acts as a pole piece.

17. The apparatus of claim 16, wherein the damping layer is positioned between the magnet and the sidewall of the rotor, wherein the damping layer is detachably coupled to the rotor.

* * * * *